United States Patent
Glozman

(10) Patent No.: US 12,458,533 B2
(45) Date of Patent: Nov. 4, 2025

(54) CAPSULORHEXIS APPARATUS AND METHOD

(71) Applicant: FORSIGHT ROBOTICS LTD., Yokneam Illit (IL)

(72) Inventor: Daniel Glozman, Kfar Yona (IL)

(73) Assignee: FORSIGHT ROBOTICS LTD., Yokneam Illit (IL)

( * ) Notice: Subject to any disclaimer, the term of this patent is extended or adjusted under 35 U.S.C. 154(b) by 326 days.

(21) Appl. No.: 18/004,907

(22) PCT Filed: Aug. 10, 2021

(86) PCT No.: PCT/IB2021/057353
§ 371 (c)(1),
(2) Date: Jan. 10, 2023

(87) PCT Pub. No.: WO2022/034488
PCT Pub. Date: Feb. 17, 2022

(65) Prior Publication Data
US 2023/0355437 A1    Nov. 9, 2023

Related U.S. Application Data

(60) Provisional application No. 63/065,068, filed on Aug. 13, 2020.

(51) Int. Cl.
*A61F 9/007*    (2006.01)

(52) U.S. Cl.
CPC ...... *A61F 9/00763* (2013.01); *A61F 9/00754* (2013.01)

(58) Field of Classification Search
CPC .. A61F 9/007; A61F 9/00736; A61F 9/00745; A61F 9/00754; A61F 9/00763;
(Continued)

(56) References Cited

U.S. PATENT DOCUMENTS

| | | | |
|---|---|---|---|
| 5,269,787 A | 12/1993 | Cozean et al. | |
| 5,410,638 A | 4/1995 | Colgate et al. | |

(Continued)

FOREIGN PATENT DOCUMENTS

| | | |
|---|---|---|
| CN | 109602498 A | 4/2019 |
| CN | 109602499 A | 4/2019 |

(Continued)

OTHER PUBLICATIONS

Communication Pursuant to Article 94(3) EPC for European Application No. 21749334.5 mailed Jun. 2, 2023.

(Continued)

*Primary Examiner* — Robert A Lynch
(74) *Attorney, Agent, or Firm* — Ballard Spahr LLP

(57) ABSTRACT

Apparatus (100) for use with a motion source that generates reciprocating linear motion. The apparatus includes a cutting ring (120) comprising a sharp cutting edge shaped and sized to engage an anterior lens capsule of the eye (20) and a longitudinal-motion member (150) coupled to the cutting ring, and that is configured to be coupled to the motion source, such that the motion source imparts reciprocating linear motion to the longitudinal motion member. The apparatus additionally includes a motion-conversion mechanism coupled to the longitudinal-motion member and to the cutting ring and configured to convert the reciprocating linear motion of the longitudinal-motion member into back-and-forth rotational motion of the cutting ring to create a circular aperture in the anterior capsule of the eye by the cutting ring. Other applications are also described.

17 Claims, 9 Drawing Sheets

(58) Field of Classification Search
CPC .......... A61F 9/013; A61F 9/0133; A61F 2009/00889; A61B 17/22004; A61B 17/320016; A61B 17/320068; A61B 17/32053; A61B 2017/2929; A61B 2017/320052; A61B 2017/320077; A61B 18/082; A61B 2018/00196
See application file for complete search history.

(56) References Cited

U.S. PATENT DOCUMENTS

| | | |
|---|---|---|
| 5,828,197 A | 10/1998 | Martin et al. |
| 7,896,653 B2 | 3/2011 | Nylen |
| 8,396,598 B2 | 3/2013 | Sutherland et al. |
| 8,509,949 B2 | 8/2013 | Bordyn et al. |
| 8,512,353 B2 | 8/2013 | Rosielle |
| 8,596,789 B2 | 12/2013 | Takii |
| 8,690,212 B2 | 4/2014 | Lee et al. |
| 9,039,681 B2 | 5/2015 | Wang et al. |
| 9,283,043 B2 | 3/2016 | Tsao et al. |
| 9,358,078 B2 | 6/2016 | Lim et al. |
| 9,383,832 B1 | 7/2016 | Lammertse |
| 9,504,604 B2 | 11/2016 | Alvarez |
| 9,655,681 B2 | 5/2017 | Meenink |
| 9,658,605 B2 | 5/2017 | Lee et al. |
| 9,788,910 B2 | 10/2017 | Schuh |
| 9,835,849 B2 | 12/2017 | Schneider et al. |
| 9,918,066 B2 | 3/2018 | Schneider et al. |
| 9,943,708 B2 | 4/2018 | Roberts et al. |
| 9,967,475 B2 | 5/2018 | Schneider et al. |
| 9,993,313 B2 | 6/2018 | Schuh et al. |
| 10,073,515 B2 | 9/2018 | Awdeh |
| 10,149,720 B2 | 12/2018 | Romo |
| 10,345,582 B2 | 7/2019 | Schneider et al. |
| 10,433,916 B2 | 10/2019 | Schneider et al. |
| 10,507,067 B2 | 12/2019 | Glozman et al. |
| 10,582,975 B2 | 3/2020 | Simi et al. |
| 10,631,949 B2 | 4/2020 | Schuh et al. |
| 10,722,312 B2 | 7/2020 | Marshall et al. |
| 10,744,035 B2 | 8/2020 | Alvarez et al. |
| 10,779,727 B2 | 9/2020 | Zeitouny et al. |
| 10,786,323 B2 | 9/2020 | Ang et al. |
| 10,806,523 B2 | 10/2020 | Roth et al. |
| 10,821,046 B2 | 11/2020 | Hares et al. |
| 10,864,051 B2 | 12/2020 | Simi et al. |
| 10,888,384 B2 | 1/2021 | Rosielle et al. |
| 10,895,742 B2 | 1/2021 | Schneider et al. |
| 10,895,750 B2 | 1/2021 | Schneider et al. |
| 10,932,865 B2 | 3/2021 | Zhang et al. |
| 11,013,565 B2 | 5/2021 | Beelen et al. |
| 11,039,891 B2 | 6/2021 | Shochat et al. |
| 11,058,574 B2 | 7/2021 | Michels et al. |
| 11,083,488 B2 | 8/2021 | Galili et al. |
| 11,090,747 B2 | 8/2021 | Simi et al. |
| 11,096,748 B2 | 8/2021 | Simi et al. |
| 11,103,319 B2 | 8/2021 | Simi et al. |
| 11,129,686 B2 | 9/2021 | Chaplin et al. |
| 11,141,233 B2 | 10/2021 | Simi et al. |
| 11,154,371 B2 | 10/2021 | Jackson et al. |
| 11,202,684 B2 | 12/2021 | Arnold et al. |
| 11,389,249 B2 | 7/2022 | Schneider et al. |
| 11,471,169 B1 | 10/2022 | Nikou et al. |
| 11,484,363 B2 | 11/2022 | Schneider et al. |
| 11,523,839 B2 | 12/2022 | Wellman et al. |
| 11,551,582 B2 | 1/2023 | Slabber et al. |
| 11,800,966 B2 | 10/2023 | Kihara et al. |
| 11,957,421 B2 | 4/2024 | Shelton et al. |
| 2001/0020200 A1 | 9/2001 | Das et al. |
| 2003/0125716 A1 | 7/2003 | Wang et al. |
| 2004/0092982 A1* | 5/2004 | Sheffer .............. A61F 9/00754 606/166 |
| 2006/0142897 A1 | 6/2006 | Green |
| 2007/0191862 A1* | 8/2007 | Ellis .................. A61F 9/00754 606/107 |
| 2007/0299427 A1 | 12/2007 | Yeung et al. |
| 2010/0137880 A1 | 6/2010 | Nahum et al. |
| 2010/0234857 A1 | 9/2010 | Itkowitz et al. |
| 2010/0331858 A1 | 12/2010 | Chang et al. |
| 2011/0054315 A1 | 3/2011 | Roberts et al. |
| 2011/0306986 A1 | 12/2011 | Lee et al. |
| 2012/0071863 A1 | 3/2012 | Lee et al. |
| 2012/0162076 A1 | 6/2012 | Obermeyer et al. |
| 2013/0035537 A1 | 2/2013 | Wallace et al. |
| 2013/0131867 A1 | 5/2013 | Olds et al. |
| 2014/0114480 A1 | 4/2014 | Greer et al. |
| 2014/0142591 A1 | 5/2014 | Alvarez et al. |
| 2014/0166023 A1 | 6/2014 | Kishi |
| 2014/0194699 A1 | 7/2014 | Roh et al. |
| 2014/0194859 A1 | 7/2014 | Ianchulev |
| 2014/0364870 A1 | 12/2014 | Alvarez et al. |
| 2015/0202009 A1 | 7/2015 | Nussbaumer et al. |
| 2015/0257841 A1 | 9/2015 | Dachs |
| 2015/0265807 A1 | 9/2015 | Park et al. |
| 2015/0335480 A1 | 11/2015 | Alvarez et al. |
| 2016/0063898 A1 | 3/2016 | Bernal |
| 2016/0157941 A1 | 6/2016 | Anvari et al. |
| 2016/0270867 A1 | 9/2016 | Scholan |
| 2016/0346060 A1 | 12/2016 | Nawrat et al. |
| 2017/0252208 A1 | 9/2017 | Meenink |
| 2018/0042682 A1 | 2/2018 | Iceman et al. |
| 2018/0104013 A1 | 4/2018 | Hamamoto et al. |
| 2018/0147017 A1 | 5/2018 | Marshall et al. |
| 2018/0200008 A1 | 7/2018 | Cooper |
| 2018/0296285 A1 | 10/2018 | Simi et al. |
| 2018/0303567 A1 | 10/2018 | Simi et al. |
| 2018/0319023 A1 | 11/2018 | Robinson et al. |
| 2018/0360654 A1 | 12/2018 | Michels et al. |
| 2019/0000706 A1 | 1/2019 | Hares et al. |
| 2019/0038369 A1 | 2/2019 | Naus et al. |
| 2019/0099232 A1 | 4/2019 | Soto et al. |
| 2019/0125582 A1 | 5/2019 | Marchini |
| 2019/0223977 A1 | 7/2019 | Galili et al. |
| 2019/0314529 A1 | 10/2019 | Mordaunt |
| 2019/0336222 A1 | 11/2019 | Schneider et al. |
| 2019/0343594 A1 | 11/2019 | Garcia Kilroy et al. |
| 2020/0008890 A1 | 1/2020 | Seneci et al. |
| 2020/0015917 A1 | 1/2020 | Cavalier et al. |
| 2020/0046394 A1 | 2/2020 | Cau |
| 2020/0146885 A1 | 5/2020 | Ootsuki et al. |
| 2020/0170740 A1 | 6/2020 | Galili et al. |
| 2020/0214777 A1 | 7/2020 | Itkowitz et al. |
| 2020/0222124 A1 | 7/2020 | Savall et al. |
| 2020/0237467 A1 | 7/2020 | Savall et al. |
| 2020/0261169 A1 | 8/2020 | Miller et al. |
| 2020/0323427 A1 | 10/2020 | Gharib et al. |
| 2020/0346046 A1 | 11/2020 | Cannata et al. |
| 2020/0360092 A1 | 11/2020 | Deng et al. |
| 2020/0360095 A1 | 11/2020 | Grant et al. |
| 2020/0397520 A1 | 12/2020 | Penny et al. |
| 2020/0397531 A1 | 12/2020 | Schrader et al. |
| 2020/0405403 A1 | 12/2020 | Shelton et al. |
| 2021/0000558 A1 | 1/2021 | Penny et al. |
| 2021/0015573 A1 | 1/2021 | Tsao et al. |
| 2021/0015574 A1 | 1/2021 | Atay et al. |
| 2021/0030499 A1 | 2/2021 | Peine |
| 2021/0045828 A1 | 2/2021 | McBrien et al. |
| 2021/0059776 A1 | 3/2021 | Simi et al. |
| 2021/0068911 A1 | 3/2021 | Walker et al. |
| 2021/0095405 A1 | 4/2021 | Ren et al. |
| 2021/0106393 A1 | 4/2021 | Simi et al. |
| 2021/0121256 A1 | 4/2021 | Simi et al. |
| 2021/0121259 A1 | 4/2021 | Simi et al. |
| 2021/0121264 A1 | 4/2021 | Tadano et al. |
| 2021/0137618 A1 | 5/2021 | Simi et al. |
| 2021/0142696 A1 | 5/2021 | Omata et al. |
| 2021/0145530 A1 | 5/2021 | Martin |
| 2021/0186636 A1 | 6/2021 | Gunn et al. |
| 2021/0196417 A1 | 7/2021 | Simi et al. |
| 2021/0205039 A1 | 7/2021 | Simi et al. |
| 2021/0228292 A1 | 7/2021 | Tsao et al. |
| 2021/0268663 A1 | 9/2021 | Gu et al. |
| 2021/0339326 A1 | 11/2021 | Simi et al. |
| 2021/0339327 A1 | 11/2021 | Simi et al. |
| 2021/0339328 A1 | 11/2021 | Simi et al. |

(56) References Cited

U.S. PATENT DOCUMENTS

| | | |
|---|---|---|
| 2021/0369374 A1 | 12/2021 | Simi et al. |
| 2021/0386495 A1 | 12/2021 | Simi et al. |
| 2021/0386496 A1 | 12/2021 | Simi et al. |
| 2021/0401522 A1 | 12/2021 | Mantri et al. |
| 2022/0000540 A1 | 1/2022 | Grover |
| 2022/0022983 A1 | 1/2022 | Arnold et al. |
| 2022/0071718 A1 | 3/2022 | Fukuno et al. |
| 2022/0079808 A1 | 3/2022 | Gliner et al. |
| 2022/0104892 A1 | 4/2022 | Hufford et al. |
| 2022/0249183 A1 | 8/2022 | Charles |
| 2022/0378613 A1 | 12/2022 | Glozman et al. |
| 2023/0070830 A1 | 3/2023 | Simi et al. |
| 2023/0142530 A1 | 5/2023 | Hipsley et al. |
| 2023/0190399 A1 | 6/2023 | Spuhler et al. |
| 2023/0226685 A1 | 7/2023 | Gil et al. |

FOREIGN PATENT DOCUMENTS

| | | |
|---|---|---|
| DE | 4012882 A1 | 10/1991 |
| EP | 3370198 A1 | 9/2018 |
| EP | 3658057 B1 | 8/2023 |
| FR | 3109717 A1 | 11/2021 |
| GB | 2605812 A | 10/2022 |
| JP | 2019530517 A | 10/2019 |
| KR | 101400447 B1 | 5/2014 |
| WO | 2009097539 A2 | 8/2009 |
| WO | 2009120945 A1 | 10/2009 |
| WO | 2009120948 A2 | 10/2009 |
| WO | 2011088400 A2 | 7/2011 |
| WO | 2011100657 A1 | 8/2011 |
| WO | 2013090598 A1 | 6/2013 |
| WO | 2013101269 A1 | 7/2013 |
| WO | 2014004114 A1 | 1/2014 |
| WO | 2014197889 A1 | 12/2014 |
| WO | 2014201165 A1 | 12/2014 |
| WO | 2015010189 A1 | 1/2015 |
| WO | 2016054256 A1 | 4/2016 |
| WO | 2017044965 A1 | 3/2017 |
| WO | 2017064306 A1 | 4/2017 |
| WO | 2017134077 A1 | 8/2017 |
| WO | 2017179044 A1 | 10/2017 |
| WO | 2017214243 A1 | 12/2017 |
| WO | 2018020251 A1 | 2/2018 |
| WO | 2018142397 A1 | 8/2018 |
| WO | 2018153512 A1 | 8/2018 |
| WO | 2018157078 A1 | 8/2018 |
| WO | 2019183106 A1 | 9/2019 |
| WO | 2019183236 A1 | 9/2019 |
| WO | 2019209967 A1 | 10/2019 |
| WO | 2019212018 A1 | 11/2019 |
| WO | 2019222228 A1 | 11/2019 |
| WO | 2020070501 A1 | 4/2020 |
| WO | 2020084611 A1 | 4/2020 |
| WO | 2020084625 A1 | 4/2020 |
| WO | 2020099192 A1 | 5/2020 |
| WO | 2020141487 A2 | 7/2020 |
| WO | 2020154012 A1 | 7/2020 |
| WO | 2021105703 A1 | 6/2021 |
| WO | 2021105992 A1 | 6/2021 |
| WO | 2021105993 A1 | 6/2021 |
| WO | 2021140513 A1 | 7/2021 |
| WO | 2021178961 A1 | 9/2021 |
| WO | 2021213751 A1 | 10/2021 |
| WO | 2021213851 A1 | 10/2021 |
| WO | 2021214750 A1 | 10/2021 |
| WO | 2021214751 A1 | 10/2021 |
| WO | 2021214754 A1 | 10/2021 |
| WO | 2021219311 A1 | 11/2021 |
| WO | 2021258007 A1 | 12/2021 |
| WO | 2022023962 A2 | 2/2022 |
| WO | 2022034488 A1 | 2/2022 |
| WO | 2022233585 A1 | 11/2022 |
| WO | 2022254335 A1 | 12/2022 |
| WO | 2023062470 A1 | 4/2023 |
| WO | 2023100123 A1 | 6/2023 |
| WO | 2023100124 A1 | 6/2023 |
| WO | 2023100125 A1 | 6/2023 |
| WO | 2023100126 A1 | 6/2023 |
| WO | 2023205761 A2 | 10/2023 |
| WO | 2023209550 A1 | 11/2023 |
| WO | 2024074948 A1 | 4/2024 |
| WO | 2024097895 A1 | 5/2024 |
| WO | 2024127205 A1 | 6/2024 |
| WO | 2024148299 A1 | 7/2024 |
| WO | 2024148316 A2 | 7/2024 |
| WO | 2024148331 A2 | 7/2024 |
| WO | 2024148334 A2 | 7/2024 |
| WO | 2024176143 A1 | 8/2024 |
| WO | 2024201236 | 10/2024 |
| WO | 2024231879 A1 | 11/2024 |

OTHER PUBLICATIONS

Final Office Action for U.S. Appl. No. 17/818,477 mailed Jul. 6, 2023.
International Search Report and Written Opinion from International Application No. PCT/IB2022/059386 mailed Jan. 3, 2023.
International Search Report and Written Opinion from International Application No. PCT/IB2022/061633 mailed Apr. 6, 2023.
International Search Report and Written Opinion from International Application No. PCT/IB2022/061634 mailed Feb. 15, 2023.
International Search Report and Written Opinion from International Application No. PCT/IB2022/061635 mailed Apr. 14, 2023.
International Search Report and Written Opinion from International Application No. PCT/IB2022/061636 mailed Feb. 24, 2023.
Invitation to Pay Additional Fees for International Application No. PCT/IB2022/061633 mailed Feb. 15, 2023.
Invitation to Pay Additional Fees for International Application No. PCT/IB2022/061635 mailed Feb. 22, 2023.
U.S. Appl. No. 18/125,489, filed Mar. 23, 2023.
U.S. Appl. No. 18/125,922, filed Mar. 24, 2023.
U.S. Appl. No. 18/298,490, filed Apr. 11, 2023.
U.S. Appl. No. 18/298,891, filed Apr. 11, 2023.
U.S. Appl. No. 63/195,429, filed Jun. 1, 2021.
U.S. Appl. No. 63/229,593, filed Aug. 5, 2021.
U.S. Appl. No. 63/256,587, filed Oct. 17, 2021.
U.S. Appl. No. 63/285,185, filed Dec. 2, 2021.
U.S. Appl. No. 63/285,218, filed Dec. 2, 2021.
U.S. Appl. No. 63/406,881, filed Sep. 15, 2022.
Communication Pursuant to Article 94(3) EPC for European Application No. 22727496.6 mailed Jun. 23, 2023.
International Search Report and Written Opinion from International Application No. PCT/IB2022/061635 mailed Jul. 3, 2023.
Communication Pursuant to Article 94(3) EPC for European Patent Application No. 21749334.5 mailed Dec. 14, 2022.
Examination Report for European Application No. 21749334.5 mailed Dec. 14, 2022.
International Search Report and Written Opinion from Intenational Application No. PCT/IB2022/055086 mailed Nov. 22, 2022.
Invitation to Pay Additional Fees for International Application No. PCT/IB2022/055086 mailed Sep. 1, 2022.
Non-Final Office Action for U.S. Appl. No. 17/818,477 mailed Mar. 2, 2023.
U.S. Appl. No. 18/095,267, filed Jan. 10, 2023.
U.S. Appl. No. 18/095,630, filed Jan. 11, 2023.
International Search Report and Written Opinion from International Application No. PCT/IB2023/054217 mailed Sep. 25, 2023.
Invitation to Pay Additional Fees for International Application No. PCT/IB2023/054217 mailed Aug. 2, 2023.
Non-Final Office Action for U.S. Appl. No. 17/818,477 mailed Dec. 5, 2024.
International Search Report and Written Opinion from International Application No. PCT/IB2021/056784 mailed Feb. 14, 2022.
International Search Report and Written Opinion from International Application No. PCT/IB2021/057353 mailed Jan. 13, 2022.
International Search Report and Written Opinion from International Application No. PCT/IB2021/057353 mailed May 3, 2022.

(56) References Cited

OTHER PUBLICATIONS

Invitation to Pay Addition Fees and, Where Applicable, Protest Fee for International Application No. PCT/IB2021/057353 mailed Nov. 22, 2021.
Invitation to Pay Additional Fees and, Where Applicable, Protest Fee for International Application No. PCT/IB2021/056784 mailed Oct. 27, 2021.
U.S. Appl. No. 17/818,477, filed Aug. 9, 2022.
U.S. Appl. No. 63/057,391, filed Jul. 28, 2020.
U.S. Appl. No. 63/065,068, filed Aug. 13, 2020.
U.S. Appl. No. 63/087,408, filed Oct. 5, 2020.
Boctor, et al., "Virtual Remote Center of Motion control for needle placement robots", Computer Aided Surgery; 9(5), 2004, pp. 175-183.
Chen, et al., "Semiautomated optical coherence tomography-guided robotic surgery for porcine lens removal", Laboratory Science: Robotic Surgery for Lens Extraction in an Animal Model, vol. 45 Issue 11, pp. 1665-1669, Nov. 2019.
Emeagwali, et al., "Performance Analysis of Steady-Hand Teleoperation versus Cooperative Manipulation", Research Gate, Conference Paper, Mar. 2004, pp. 1-7.
Mitchell, et al., "Development and Application of a New Steady-Hand Manipulator for Retinal Surgery", Proceedings 2007 IEEE International Conference on Robotics and Automation, pp. 623-629, 2007.
Wilson, et al., "Intraocular robotic interventional surgical system (IRISS): Mechanical design, evaluation, and master-slave manipulation", The International Journal of Medical Robotics and Computer Assisted Surgery,, pp. 1-12, 2018.
Final Office Action for U.S. Appl. No. 17/818,477 mailed Jul. 9, 2024.
International Search Report and Written Opinion from International Application No. PCT/IB2023/059694 mailed Dec. 22, 2023.
International Search Report and Written Opinion from International Application No. PCT/IB2023/062467 mailed May 2, 2024.
Invitation to Pay Additional Fees for International Application No. PCT/IB2023/062467 mailed Mar. 5, 2024.
U.S. Appl. No. 18/714,027, filed May 28, 2024.
U.S. Appl. No. 63/285,147, filed Dec. 2, 2021.
Extended European Search Report for European Application No. 24163523.4 mailed Jun. 27, 2024.
Final Office Action for U.S. Appl. No. 17/818,477 mailed Mar. 26, 2025.
International Search Report and Written Opinion from International Application No. PCT/IB2024/051675 mailed Jul. 15, 2024.
International Search Report and Written Opinion from International Application No. PCT/IB2024/052760 mailed Aug. 20, 2024.
International Search Report and Written Opinion from International Application No. PCT/IB2024/054525 mailed Sep. 16, 2024.
Invitation to Pay Additional Fees for International Application No. PCT/IB2024/051675 mailed May 23, 2024.
Invitation to Pay Additional Fees for International Application No. PCT/IB2024/052760 mailed Jun. 28, 2024.
Invitation to Pay Additional Fees for International Application No. PCT/IB2024/054525 mailed Jul. 25, 2024.
Non-Final Office Action for U.S. Appl. No. 17/818,477 mailed Dec. 2, 2024.
Non-Final Office Action for U.S. Appl. No. 18/298,891 mailed Mar. 10, 2025.
U.S. Appl. No. 18/714,024, filed May 28, 2024.
U.S. Appl. No. 18/822,932, filed Sep. 3, 2024.
U.S. Appl. No. 18/825,382, filed Sep. 5, 2024.
U.S. Appl. No. 18/860,829, filed Oct. 28, 2024.
U.S. Appl. No. 19/097,061, filed Apr. 1, 2025.
U.S. Appl. No. 63/335,751, filed Apr. 28, 2022.
U.S. Appl. No. 63/412,475, filed Oct. 2, 2022.
U.S. Appl. No. 63/536,772, filed Sep. 6, 2023.
U.S. Appl. No. 63/537,053, filed Sep. 7, 2023.
Examination Report for European Application No. 22823628.7 mailed May 22, 2025.
Non-Final Office Action for U.S. Appl. No. 17/818,477 mailed Dec. 5, 2023.
Non-Final Office Action for U.S. Appl. No. 18/125,922 mailed May 14, 2025.
Notice of Allowance for U.S. Appl. No. 18/126,095 mailed Jun. 3, 2025.
Restriction Requirement for U.S. Appl. No. 18/125,489 mailed May 19, 2025.
Restriction Requirement for U.S. Appl. No. 18/298,490 mailed Apr. 9, 2025.

\* cited by examiner

CAPSULORHEXIS APPARATUS AND METHOD

CROSS-REFERENCES TO RELATED APPLICATIONS

The present application is a US national phase application of PCT Application No. PCT/IB2021/057353 to Glozman (published as WO 22/034488), filed Aug. 10, 2021, which claims priority from U.S. Provisional Patent Application No. 63/065,068 to Glozman, filed Aug. 13, 2020, entitled "CAPSULORHEXIS APPARATUS AND METHOD", which is incorporated herein by reference.

FIELD OF EMBODIMENTS OF THE INVENTION

Some applications of the present invention generally relate to medical apparatus and methods. Specifically, some applications of the present invention relate to apparatus and methods for performing intraocular surgery.

BACKGROUND

Cataract surgery involves the removal of the natural lens of the eye that has developed an opacification (known as a cataract), and its replacement with an intraocular lens. Such surgery typically involves a number of standard steps, which are performed sequentially.

In an initial step, the patient's eye is anesthetized, and the face around the eye is disinfected (typically, with iodine solution), and their face is covered by a sterile drape, such that only the eye is exposed. When the disinfection and draping has been completed, the eye is anesthetized, typically using a local anesthetic, which is administered in the form of liquid eye drops. The eyeball is then exposed, using an eyelid speculum that holds the upper and lower eyelids open. One or more incisions (and typically two or three incisions) are made in the cornea of the eye. The incision(s) are typically made using a specialized blade, that is called a keratome blade. At this stage, licodaine is typically injected into the anterior chamber of the eye, in order to further anesthetize the eye. Following this step, a viscoelastic injection is applied via the corneal incision(s). The viscoelastic injection is performed in order to stabilize the anterior chamber and to help maintain eye pressure during the remainder of the procedure, and also in order to distend the lens capsule.

In a subsequent stage, known as capsulorhexis, a part of the anterior lens capsule is removed. Various enhanced techniques have been developed for performing capsulorhexis, such as laser-assisted capsulorhexis, zepto-rhexis (which utilizes precision nano-pulse technology), and marker-assisted capsulorhexis (in which the cornea is marked using a predefined marker, in order to indicate the desired size for the capsule opening).

Subsequently, it is common for a fluid wave to be injected via the corneal incision, in order to dissect the cataract's outer cortical layer, in a step known as hydrodissection. In a subsequent step, known as hydrodelineation, the outer softer epi-nucleus of the lens is separated from the inner firmer endo-nucleus by the injection of a fluid wave. In the next step, ultrasonic emulsification of the lens is performed, in a process known as phacoemulsification. The nucleus of the lens is broken initially using a chopper, following which the outer fragments of the lens are broken and removed, typically using an ultrasonic phacoemulsification probe. Further typically, a separate tool is used to perform suction during the phacoemulsification. When the phacoemulsification is complete, the remaining lens cortex (i.e., the outer layer of the lens) material is aspirated from the capsule. During the phacoemulsification and the aspiration, aspirated fluids are typically replaced with irrigation of a balanced salt solution, in order to maintain fluid pressure in the anterior chamber. In some cases, if deemed to be necessary, then the capsule is polished. Subsequently, the intraocular lens (IOL) is inserted into the capsule. The IOL is typically foldable and is inserted in a folded configuration, before unfolding inside the capsule. At this stage, the viscoelastic is removed, typically using the suction device that was previously used to aspirate fluids from the capsule. If necessary, the incision (s) is sealed by elevating the pressure inside the bulbus oculi (i.e., the globe of the eye), causing the internal tissue to be pressed against the external tissue of the incision, such as to force closed the incision.

SUMMARY

In accordance with some applications of the present invention, apparatus and method are provided for performing capsulorhexis during cataract surgery by cutting a circular aperture in an anterior lens capsule of an eye of a subject. The apparatus is for use with a motion source that generates reciprocating linear motion (e.g., axial and/or transverse reciprocating linear motion) and causes automatic motion of the apparatus. Typically, the apparatus includes a cutting ring having a sharp cutting edge, which is shaped and sized to engage the anterior lens capsule of the eye. Coupled to the cutting ring is a longitudinal-motion member that is configured to be coupled to the motion source, such that the motion source imparts the reciprocating linear motion to the longitudinal motion member. For some applications, the apparatus further includes a motion-conversion mechanism coupled to the longitudinal-motion member and to the cutting ring, and which converts the reciprocating linear motion of the longitudinal-motion member into rotational motion of the cutting ring to create the circular aperture in the anterior capsule of the eye by the cutting ring.

For some applications, the motion source includes an ultrasonic motion source, e.g., a phacoemulsification probe that generates ultrasonic motion. Typically, the longitudinal motion member, is configured to be coupled to the phacoemulsification probe such that the ultrasonic motion is imparted to the longitudinal-motion member and consequently onto the cutting ring (which is coupled to the longitudinal motion member) to thereby cause the ring to cut an aperture in the anterior lens capsule. For some applications, the phacoemulsification probe imparts a reciprocating linear motion to the longitudinal motion member, and the motion-conversion mechanism of the apparatus converts the reciprocating linear motion into rotational motion of the cutting ring to create the circular aperture in the anterior capsule.

For some applications, the motion-conversion mechanism comprises an inner shaft that engages the longitudinal-motion member and the cutting ring, such that the reciprocating linear motion imparted to the longitudinal-motion member produces relative motion of the inner shaft with respect to the ring, and rotation of the ring with respect to a longitudinal axis of the longitudinal motion member. For some applications, the motion-conversion mechanism comprises an outer shaft that engages the longitudinal-motion member and the cutting ring, such that the reciprocating linear motion imparted to the longitudinal-motion member produces relative motion of the outer shaft with respect to the ring, and rotation of the ring with respect to a longitudinal axis of the longitudinal motion member. For some applications, relative motion of the outer or inner shafts with respect to the cutting ring causes back-and-forth rotational motion of the cutting ring rather than a continuous rotational motion in a single direction. Additionally, for some applications, the motion source generates the reciprocating linear motion at a high speed such that when converted into rotational motion, the cutting ring rotates back and forth with respect to the longitudinal axis of the longitudinal motion member at a similar high speed. The high-speed, back-and-forth rotational motion of the cutting ring typically prevents the lens capsule from adhering to the cutting ring and facilitates creating a well-defined smooth circular aperture in the anterior lens capsule.

For some applications, the longitudinal-motion member comprises an outer shaft that is fixedly coupled to the cutting ring at a first location on the cutting ring, and an inner shaft that undergoes reciprocating linear motion with respect to the cutting ring and that is coupled to the cutting ring at a second location on the cutting ring, such that the reciprocating linear motion that is imparted to the longitudinal-motion member produces rotational motion of the ring with respect to the longitudinal motion member. Additionally, in such a manner, linear motion of the cutting ring is restrained.

For some applications, the longitudinal-motion member comprises an inner shaft that is fixedly coupled to the cutting ring at a first location on the cutting ring, and an outer shaft that undergoes reciprocating linear motion with respect to the cutting ring and that is coupled to the cutting ring at a second location on the cutting ring, such that the reciprocating linear motion that is imparted to the longitudinal-motion member produces rotational motion of the ring with respect to the longitudinal motion member. Additionally, in such a manner, linear motion of the cutting ring is restrained.

As provided by some applications of the present invention, subsequently to creating a corneal incision in the eye of the subject, the cutting ring is inserted through the incision, and the sharp cutting edge is positioned over the anterior capsule of the lens. The motion source is then activated to produce reciprocating linear motion. Using the motion-conversion mechanism, rotational motion is generated in the cutting ring by converting the reciprocating linear motion into rotational motion. Using the rotational motion of the cutting ring, the circular aperture in the anterior capsule of the lens is created. The cut piece of the anterior capsule is then removed, thereby exposing the native lens for subsequent phacoemulsification and removal, prior to placement of the intraocular lens (IOL).

As described hereinabove, for some applications, the motion source includes a phacoemulsification probe, and the motion generated by phacoemulsification probe is used to move the cutting ring to perform the capsulorhexis (typically through converting linear motion of the phacoemulsification probe into rotational motion of the cutting ring). Conveniently, following the capsulorhexis, the same phacoemulsification probe is used for ultrasonic emulsification and removal of the lens.

Capsulorhexis is a critical step in cataract surgery, affecting how an implanted intraocular lens (IOL) will be positioned in the capsule. If the capsulorhexis is not done with a high level of accuracy, the position of the IOL may not be ideal, leading to suboptimal vision outcome. For example, if the capsulorhexis is not done with a high level of accuracy, peripheral capsular tear can occur, leading to posterior capsular tear, resulting in numerous complications such as dropped nucleus, mispositioning of the IOL, low capsular support requiring a special type of IOL, all of which lead to suboptimal vision outcome. Therefore, capsulorhexis during manual cataract surgery typically requires the work of a skilled surgeon to gently manipulate a hand-held tool (e.g., forceps and/or a knife) to cut and create the circular opening in the anterior lens capsule. Using the apparatus and method provided in accordance with some applications of the present invention, typically allows performing capsulorhexis during cataract surgery with a high degree of accuracy, precision, and reproducibility. The apparatus disclosed herein provides automated and controlled rotational motion of a cutting tool. This rotation of the cutting tool, typically results in accurate, reproducible circular cuts of a controlled diameter in the lens capsule, thereby being suitable for use also by a less experienced surgeon.

Additionally, when using tools such as forceps and/or a knife to perform manual capsulorhexis, it is often the case that, being a delicate and thin membrane, the anterior lens capsule adheres to the tool when the tool is moved in a continuous circular pattern, thereby adding to the complexity of the procedure. As described hereinabove, using the apparatus and method in accordance with some applications of the present invention, provides high-speed back-and-forth rotational motion of the cutting ring. Such motion generally prevents adherence of the lens capsule to the apparatus and allows cutting of the anterior lens capsule in a manner that reduces the risk of complications such as accidental tearing and loss of control over the dimensions of the aperture. Furthermore, use of the apparatus disclosed herein generally does not generate additional costs to the cataract surgery as it is easy and inexpensive to manufacture, and activation thereof is typically done using the phacoemulsification probe which is standardly used in cataract surgery.

There is therefore provided, in accordance with some applications of the present invention, apparatus for use with a motion source that generates reciprocating linear motion, the apparatus including:

a cutting ring comprising a sharp cutting edge shaped and sized to engage an anterior lens capsule of the eye;

a longitudinal-motion member coupled to the cutting ring, and that is configured to be coupled to the motion source, such that the motion source imparts reciprocating linear motion to the longitudinal motion member; and a motion-conversion mechanism coupled to the longitudinal-motion member and to the cutting ring and configured to convert the reciprocating linear motion of the longitudinal-motion member into back-and-forth rotational motion of the cutting ring to create a circular aperture in the anterior capsule of the eye by the cutting ring.

For some applications, the cutting ring includes a first cutting ring and the apparatus further includes at least a second cutting ring, and the motion-conversion mechanism is coupled to the longitudinal-motion member and to the first and second cutting rings and configured to convert the reciprocating linear motion of the longitudinal-motion member into back-and-forth rotational motion of the first and second cutting rings, the back-and-forth rotational motion of the first cutting ring being in an opposite direction of the back-and-forth rotational motion of the second cutting ring.

For some applications, the apparatus is configured for use with motion source that generates reciprocating axial linear motion, and the motion-conversion mechanism is configured to convert the reciprocating axial linear motion of the longitudinal-motion member into back-and-forth rotational motion of the cutting ring.

For some applications, the apparatus is configured for use with motion source that generates reciprocating transverse linear motion, and the motion-conversion mechanism is configured to convert the reciprocating transverse linear motion of the longitudinal-motion member into back-and-forth rotational motion of the cutting ring.

For some applications, the cutting ring has a nominal diameter of 4-8 mm.

For some applications, the cutting ring has a nominal diameter of 4.2-8.2 mm.

For some applications, the cutting ring has a and wall thickness of 0.05-0.25 mm.

For some applications, the sharp cutting edge is shaped to define a serrated cutting edge.

For some applications, the motion source includes an ultrasonic motion source.

For some applications, the ultrasonic motion source includes a phacoemulsification probe and the longitudinal-motion member includes a shaft that is configured to be coupled to the phacoemulsification probe.

For some applications, the motion-conversion mechanism includes a shaft engaging the longitudinal-motion member and the cutting ring such that the reciprocating linear motion imparted to the longitudinal-motion member produces (a) relative motion of the shaft with respect to the ring, and (b) rotation of the ring with respect to a longitudinal axis of the longitudinal motion member.

For some applications, the cutting ring includes a first cutting ring and the apparatus further includes at least a second cutting ring, and the apparatus further includes a first cantilever engaging the longitudinal-motion member and the first cutting ring, and a second cantilever engaging the longitudinal-motion member and the second cutting ring.

For some applications, the apparatus is configured to restrain linear motion of the cutting ring.

For some applications, the longitudinal-motion member includes an outer shaft that is fixedly coupled to the cutting ring at a first location on the cutting ring, and an inner shaft that is able to undergo reciprocating linear motion with respect to the cutting ring and that is coupled to the cutting ring at a second location on the cutting ring, such that the reciprocating linear motion that is imparted to the longitudinal-motion member produces back-and-forth rotational motion of the ring with respect to the longitudinal motion member.

For some applications, the longitudinal-motion member includes an inner shaft that is fixedly coupled to the cutting ring at a first location on the cutting ring, and an outer shaft that is able to undergo reciprocating linear motion with respect to the cutting ring and that is coupled to the cutting ring at a second location on the cutting ring, such that the reciprocating linear motion that is imparted to the longitudinal-motion member produces back-and-forth rotational motion of the ring with respect to the longitudinal motion member.

There is additionally further provided in accordance with some applications of the present invention, a method for creating a circular aperture in the anterior capsule of an eye of a subject, including:
  creating a corneal incision in the eye of the subject;
  inserting a cutting ring through the incision;
  positioning a sharp cutting edge of the cutting ring over the anterior capsule of the eye;
  activating a motion source to produce reciprocating linear motion;
  using a motion-conversion mechanism, generating back-and-forth rotational motion in the cutting ring by converting the reciprocating linear motion into back-and-forth rotational motion; and
  creating a circular aperture in the anterior capsule of the eye using the back-and-forth rotational motion of the cutting ring.

For some applications, inserting the cutting ring through the incision includes radially compressing the cutting ring to facilitate insertion of the cutting ring through the incision.

For some applications, the reciprocating linear motion includes reciprocating axial linear motion, and converting includes converting the reciprocating axial linear motion into back-and-forth rotational motion.

For some applications, the reciprocating linear motion includes reciprocating transverse linear motion, and converting includes converting the reciprocating transverse linear motion into back-and-forth rotational motion.

There is further provided in accordance with some applications of the present invention, apparatus for use with a phacoemulsification probe that includes a source of ultrasonic motion that generates ultrasonic motion, the apparatus including:
  a cutting ring including a sharp cutting edge shaped and sized to engage an anterior capsule of the eye;
  a shaft coupled to the cutting ring and configured to be coupled to the phacoemulsification probe such as to impart the ultrasonic motion to the cutting ring, to thereby cause the ring to cut an aperture in the anterior capsule of the eye.

For some applications, the shaft has a proximal portion and a distal portion, and the proximal portion of the shaft is configured to be removably couplable to the phacoemulsification probe and the cutting ring is disposed on the distal portion of the shaft.

For some applications, the ultrasonic motion includes a reciprocating linear motion and the apparatus further includes a motion-conversion mechanism coupled to the shaft and to the cutting ring and configured to convert the reciprocating linear motion into back-and-forth rotational motion of the cutting ring to create the aperture in the anterior capsule of the eye.

For some applications, the shaft includes an outer shaft and the motion-conversion mechanism includes a an inner shaft disposed within the outer shaft and engaging the cutting ring such that reciprocating linear motion to the inner shaft produces (a) relative motion of the inner shaft with respect to the cutting ring, and (b) rotation of the cutting ring with respect to a longitudinal axis of the outer shaft.

There is further provided in accordance with some applications of the present invention, a method including:
  creating a corneal incision in the eye of the subject;
  inserting a cutting ring through the incision, the cutting ring being disposed on a shaft, the shaft being coupled to a phacoemulsification probe that includes an ultrasonic motion source;
  positioning a sharp cutting edge of the cutting ring over the anterior capsule of the eye;
  using the ultrasonic motion source of the phacoemulsification probe, imparting motion through the shaft to the cutting ring; and
  thereby cutting an aperture in the anterior capsule of the eye using the cutting ring.

For some applications, the method further includes removing the lens of the eye at least partially using the phacoemulsification probe.

For some applications, inserting the cutting ring through the incision includes radially compressing the cutting ring to facilitate insertion of the cutting ring through the incision.

For some applications, the phacoemulsification probe is configured to undergo reciprocating linear motion and the method further includes converting the reciprocating linear motion of the phacoemulsification probe into back-and-forth rotational motion of the cutting ring, and cutting the aperture includes using the back-and-forth rotational motion of the cutting ring to cut the aperture.

For some applications, the phacoemulsification probe is configured undergo reciprocating axial linear motion, and converting includes converting the reciprocating axial linear motion of the phacoemulsification probe into back-and-forth rotational motion of the cutting ring.

For some applications, the phacoemulsification probe is configured to move in a reciprocating transverse linear motion pattern, and converting includes converting the reciprocating transverse linear motion of the phacoemulsification probe into back-and-forth rotational motion of the cutting ring.

There is further provided, in accordance with some applications of the present invention, apparatus for use with a motion source that generates rotational motion, the apparatus including:
  a cutting ring including a sharp cutting edge shaped and sized to engage an anterior lens capsule of the eye;
  an elongate shaft including:
    a proximal end that is coupled to the motion source such that the motion source imparts rotational motion to the elongate shaft; and
    an offset axial portion that is offset relative to the proximal end of the shaft, the offset axial portion being coupled to the cutting ring,
  the elongate shaft being configured such that, due to the offset of offset axial portion, as the elongate shaft rotates it causes the offset axial portion to move from side-to-side in an alternating manner, to thereby cause the portion of the cutting ring to which the offset axial portion is coupled to move from side-to-side in an alternating manner.

For some applications, the cutting ring defines an opening, and wherein the offset axial portion of the elongate shaft is coupled to the cutting ring by being inserted into an opening defined by the cutting ring.

For some applications, the cutting ring has a nominal diameter of 4-8 mm.

For some applications, the cutting ring has a nominal diameter of 4.2-8.2 mm.

For some applications, the cutting ring has a and wall thickness of 0.05-0.25 mm.

For some applications, the sharp cutting edge is shaped to define a serrated cutting edge.

For some applications, the apparatus further includes a central axis disposed at a center of the cutting ring, and a plurality of struts extending radially from the central axis to the cutting ring and configured to stabilize the cutting ring such that it remains centered about central axis, to thereby cause the side-to-side motion of the portion of the cutting ring to which the offset axial portion is coupled to be generate back-and-forth rotational motion of the cutting ring.

For some applications, the cutting ring is configured to be radially compressed in order to facilitate insertion of the ring through the relatively small incision, and the struts are configured to become folded when the cutting ring is radially compressed.

There is further provided, in accordance with some applications of the present invention, a method for creating a circular aperture in the anterior capsule of an eye of a subject, including:
  creating a corneal incision in the eye of the subject;
  inserting a cutting ring through the incision;
  positioning a sharp cutting edge of the cutting ring over the anterior capsule of the eye;
  activating a motion source to generate rotational motion;
  using an elongate shaft converting the rotational motion of motion source to back-and-forth rotational motion of the cutting ring, by causing a portion of the cutting ring to which the elongate shaft is coupled to move from side-to-side in an alternating manner, to thereby generate back-and-forth rotational motion of the cutting ring; and
  creating a circular aperture in the anterior capsule of the eye using the back-and-forth rotational motion of the cutting ring.

The present invention will be more fully understood from the following detailed description of embodiments thereof, taken together with the drawings, in which:

DETAILED DESCRIPTION OF EMBODIMENTS

Figure 1:
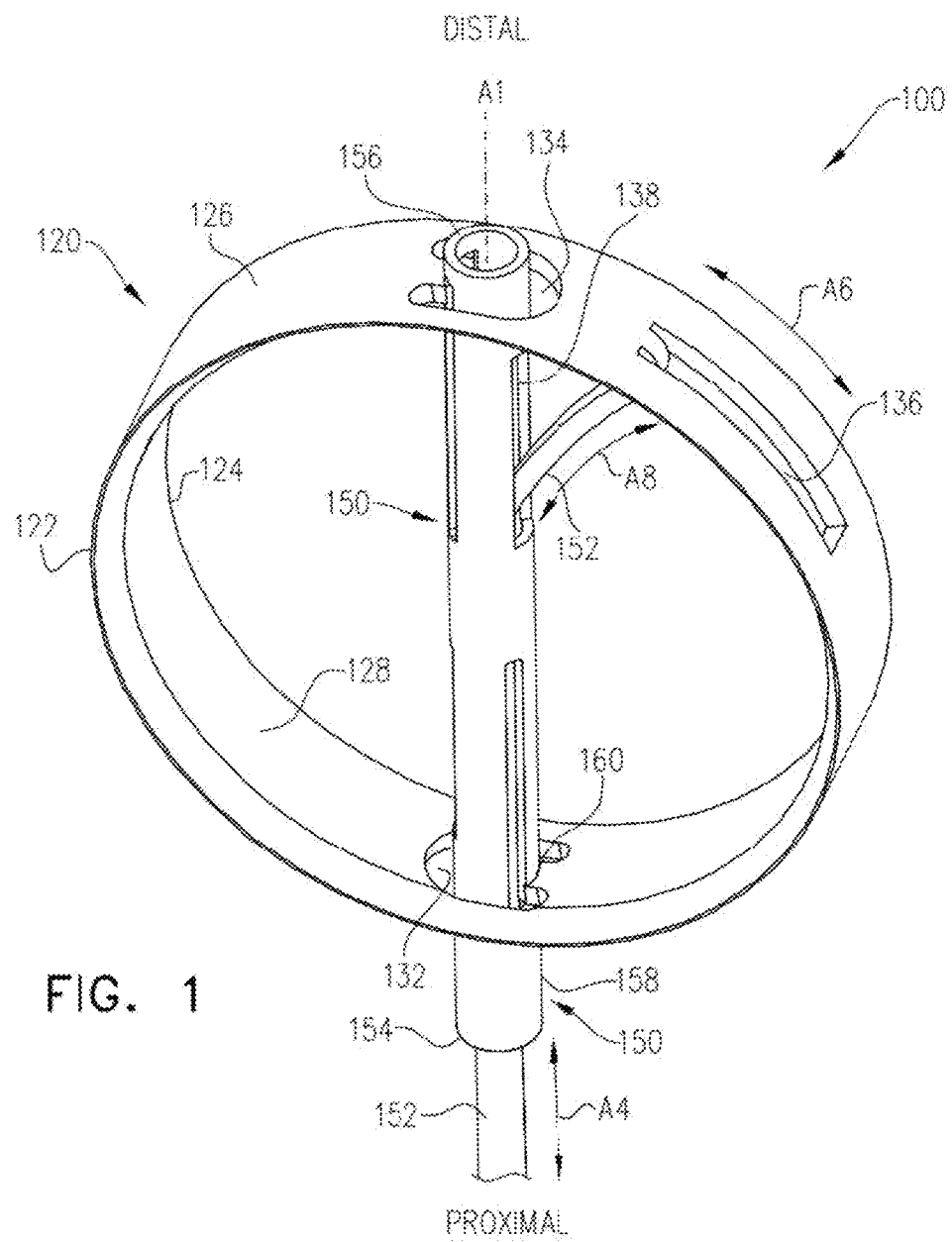
FIG. 1 is a schematic illustration of apparatus for performing capsulorhexis during cataract surgery in an eye of a subject, in accordance with some applications of the present invention.

Reference is made to FIG. 1, which is a schematic illustration of apparatus 100 for performing capsulorhexis during cataract surgery in an eye of a subject, in accordance with some applications of the present invention. Apparatus 100 typically comprises a cutting ring 120 and a longitudinal-motion member 150.

For some applications, cutting ring 120 has a sharp cutting edge 122 shaped and sized to engage the anterior lens capsule of the eye to create a circular aperture of a predetermined diameter in the anterior lens capsule of the eye. Cutting ring 120 typically comprises a resilient yet flexible metal alloy, e.g. nitinol. Cutting ring 120 is typically shaped to define sharp cutting edge 122, a blunt edge 124 and a circumferential surface having an inner surface 128 and an outer surface 126. For some applications, cutting ring 120 has a nominal diameter of 4-9 mm, e.g., 4.2-8.2 mm, and a wall thickness of 0.05-0.25 mm.

For some applications, longitudinal-motion member 150 has a proximal end 154 and a distal end 156. It is noted that in this context, in the specification and in the claims, "proximal" means closer to the user of the apparatus, and "distal" means farther from the user. The proximal and distal ends of the apparatus are indicated in FIG. 1. Longitudinal-motion member 150 is configured to engage cutting ring 120 by being positioned through openings 132 and 134 in cutting ring 120. Distal end 156 of longitudinal-motion member 150 typically terminates at, or protrudes from, opening 134.

Apparatus 100 is for use with a motion source that generates reciprocating linear motion (the motion source is not shown in FIG. 1). Longitudinal-motion member 150 is configured to be coupled the motion source, such that the motion source imparts reciprocating linear motion to longitudinal-motion member 150. Typically, proximal end 154 connects to the motion source such that the linear motion generated by the motion source is imparted to longitudinal-motion member 150. For some applications, the motion source comprises an ultrasonic motion source, e.g., a phacoemulsification probe, and proximal end 154 of longitudinal-motion member 150 couples to the ultrasonic motion source, e.g., the phacoemulsification probe.

For some applications, the reciprocating linear motion generated by the motion source is a reciprocating axial linear motion (i.e., a back-and-forth motion along longitudinal axis A1 of the longitudinal-motion member) as indicated by arrow A4 in FIG. 1. This reciprocating axial linear motion is imparted to longitudinal-motion member 150 to cause at least a portion of the longitudinal-motion member to move in the same reciprocating axial linear motion. For some such applications, apparatus 100 comprises a motion-conversion mechanism coupled to longitudinal-motion member 150 and to cutting ring 120 and which converts the reciprocating linear motion of longitudinal-motion member 150 into rotational motion of cutting ring 120, to create the circular aperture in the anterior capsule of the eye.

For some applications, longitudinal-motion member 150 has an outer shaft 158 and an inner shaft 152 that facilitate motion conversion from the linear motion of longitudinal-motion member 150 to the rotational motion of cutting ring 120. For some applications, outer shaft 158 of longitudinal-motion member 150 is configured to be coupled to the motion source. Inner shaft 152 typically engages outer shaft 158 and cutting ring 120 such that the reciprocating linear motion imparted to longitudinal-motion member 150 produces (a) relative motion of inner shaft 152 with respect to outer shaft 158 and with respect to cutting ring 120, and (b) rotation of cutting ring 120 with respect to a longitudinal axis A1 of longitudinal-motion member 150. Alternatively (not shown), inner shaft 152 of longitudinal-motion member 150 is configured to be coupled to the motion source. For such application, outer shaft 158 typically engages inner shaft 152 and cutting ring 120 such that the reciprocating linear motion imparted to longitudinal-motion member 150 produces (a) relative motion of outer shaft 158 with respect to inner shaft 152 and with respect to cutting ring 120, and (b) rotation of cutting ring 120 with respect to a longitudinal axis A1 of longitudinal-motion member 150.

Referring to the application shown in FIG. 1, inner shaft 152 extends through a portion of outer shaft 158, passes out of shaft 158 through lateral opening 138, and into slit 136 in the circumferential surface of cutting ring 120 to form a type of a cantilever, extending from longitudinal-motion member 150 to slit 136 (indicated by arrow A8). The reciprocating linear motion imparted to longitudinal-motion member 150 by the motion source produces relative motion of inner shaft 152 with respect to slit 136 of cutting ring 120, and this relative motion causes rotation of cutting ring 120 with respect to longitudinal-motion member 150, thereby converting the linear motion produced by the motion source into rotational motion of the cutting ring. For some applications, inner shaft engages the cutting ring indirectly. For example, a separate cantilever (not shown) may extend from the inner shaft to the cutting ring, rather than the inner shaft itself extending to the cutting ring.

Typically, relative motion of inner shaft 152 with respect to slit 136 (inner shaft moving sideways in the slit) causes back-and-forth rotational motion of cutting ring 120 in the directions indicated by double-headed arrow A6. Thereby, when placed on the anterior lens capsule of the eye, cutting ring 120 cuts a circular aperture in the lens capsule through high-speed back-and-forth rotational motion of the ring as indicated by arrow A6. Typically, the motion source (e.g., the ultrasonic motion source) generates high-speed vibrational motion such that the reciprocating linear motion imparted to longitudinal-motion member 150 is converted into high-speed rotational back-and-forth motion of cutting ring 120 (arrow A6). This high-speed rotational back-and-forth motion of cutting ring 120 typically prevents the lens capsule from adhering to the cutting ring during motion of the cutting ring, thereby resulting in a clean and clear cut of the anterior lens capsule.

It is noted that slit 136 is shown by way of illustration and not limitation. For some applications, the circumferential surface of cutting ring 120 is shaped to define a curved groove instead of slit 136. For some such applications, inner shaft 152 passes out of outer shaft 158 through lateral opening 138 and into the curved groove. A distal end of inner shaft 152 is typically disposed within the curved groove, and is configured such that reciprocating linear motion of longitudinal-motion member 150 produces relative motion of inner shaft 152 with respect to the curved groove causing rotation of the cutting ring with respect to longitudinal axis A1 of longitudinal-motion member 150.

Typically, not only is apparatus 100 configured to convert linear motion into rotational motion, but apparatus 100 is additionally configured to inhibit axial linear motion of cutting ring 120. For some applications, a portion of longitudinal-motion member 150 is fixedly coupled to cutting ring 120 such that axial linear motion of cutting ring 120 is restrained. For example, as shown in FIG. 1, outer shaft 158 is fixedly coupled to cutting ring 120 at a first location 160 on the cutting ring. In this example, location 160 is an edge of opening 132 in cutting ring 120, opening 132 being shaped and sized to allow rotational motion of the ring with respect to the longitudinal-motion member 150. Inner shaft 152 undergoes reciprocating linear motion with respect to the cutting ring and engages the cutting ring at a second location (e.g., slit 136) on the cutting ring, such that the reciprocating linear motion that is imparted to longitudinal-motion member 150 produces rotational motion of the ring with respect to the longitudinal motion member.

As described hereinabove, for some applications, the functions of inner shaft 152 and outer shaft 158 of longitudinal-motion member 150 are reversed, *Mutatis mutandis.*

Figure 2:
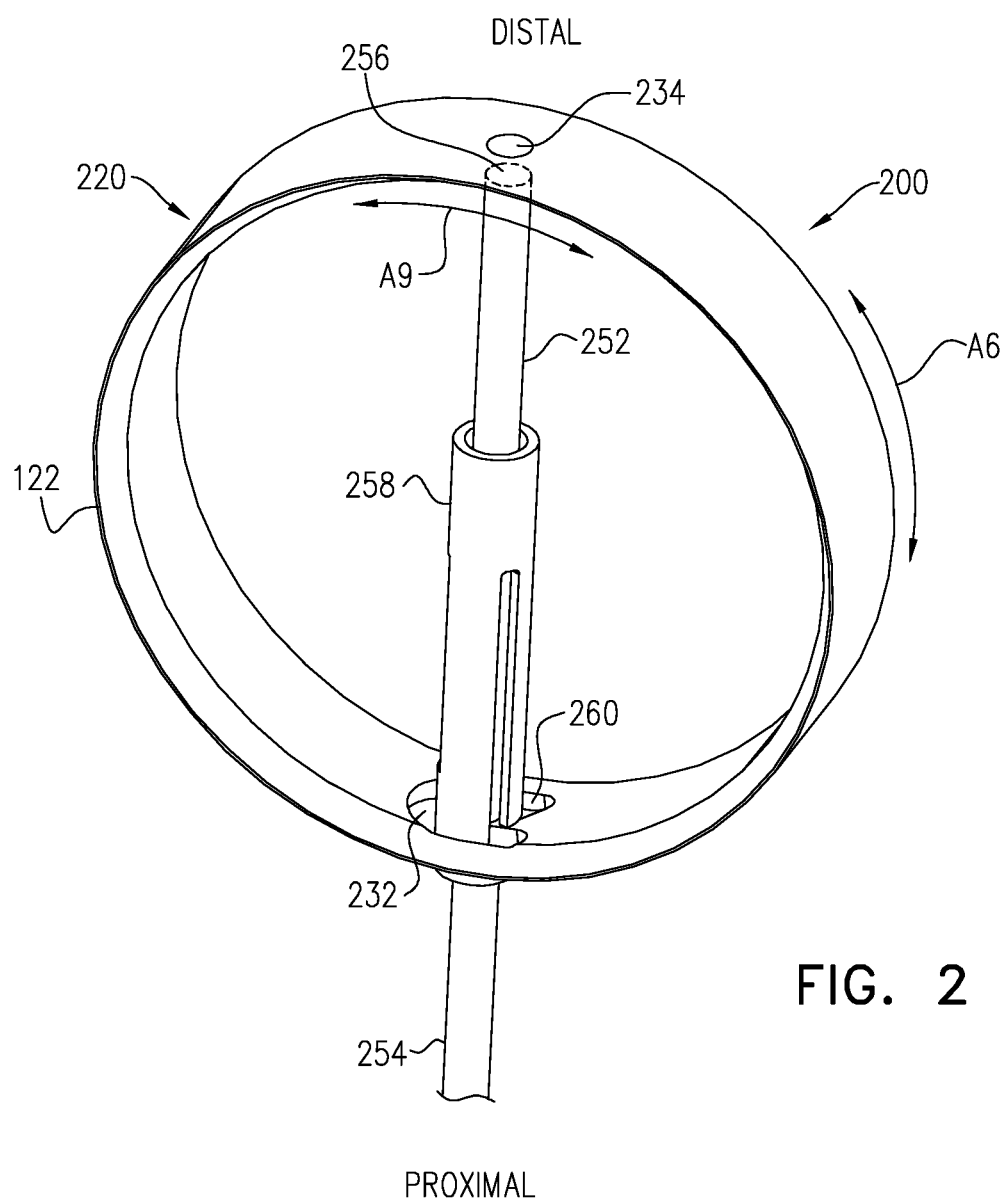
FIG. 2 is a schematic illustration of apparatus for performing capsulorhexis during cataract surgery in an eye of a subject, in accordance with another application of the present invention.

Reference is now made to FIG. 2, which is a schematic illustration of apparatus 200 for performing capsulorhexis during cataract surgery in an eye of a subject, in accordance with another application of the present invention. Apparatus 200 typically comprises a cutting ring 220 and a longitudinal-motion member 250, comprising an inner shaft 252 and an outer shaft 258. Longitudinal-motion member 250 has a proximal end 254 and a distal end 256 and is coupled to cutting ring 220 by being positioned through opening 232 and by attaching to location 234 at the distal end of the cutting ring. Distal end 256 of longitudinal-motion member 250 typically terminates at location 234 (however, in some applications, distal end 256 protrudes from an opening at location 234). It is noted that, apparatus 200 is generally similar to apparatus 100 except where indicated otherwise.

In accordance with some applications of the present invention, apparatus 200 is for use with a motion source that generates reciprocating transverse linear motion as indicated by arrow A9 in FIG. 2 (the motion source is not shown in FIG. 2). This reciprocating transverse linear motion is imparted to longitudinal-motion member 250 (e.g., to inner shaft 252) to cause distal end 256 of the longitudinal-motion member to move in the same reciprocating transverse linear motion (indicated by arrow A9). The reciprocating transverse linear motion of longitudinal-motion member 250 is converted into rotational motion of cutting ring 220, such that when placed on an anterior lens capsule of the eye, cutting ring 220 rotates back-and-forth at a high speed to cut the circular aperture in the lens capsule due to the back-and-forth rotational motion pattern.

Typically, a portion of longitudinal-motion member 250 is fixedly coupled to cutting ring 220 such that only motion of cutting ring 220 in the direction indicated by arrow A6, is possible. For example, as shown in FIG. 2, outer shaft 258 is fixedly coupled to cutting ring 220 at a first location 260 on the cutting ring. In this example, location 260 is an edge of opening 232 in cutting ring 220, opening 232 being shaped and sized to allow rotational motion of the ring with respect to the longitudinal-motion member 250. Inner shaft 252 undergoes reciprocating linear motion with respect to the cutting ring and is coupled to the cutting ring at a second location 234 on the cutting ring, such that the reciprocating transverse linear motion that is imparted to distal end 256 of longitudinal-motion member 250 produces rotational motion of cutting ring 220 with respect to longitudinal-motion member 250. For some applications, the functions of the inner and outer shafts are reversed, *Mutatis mutandis.*

For some applications, the motion source that generates the transverse linear motion is an ultrasonic motion source, e.g., a phacoemulsification probe, and proximal end 254 of longitudinal-motion member 250 is coupled to the phacoemulsification probe.

Figure 3:
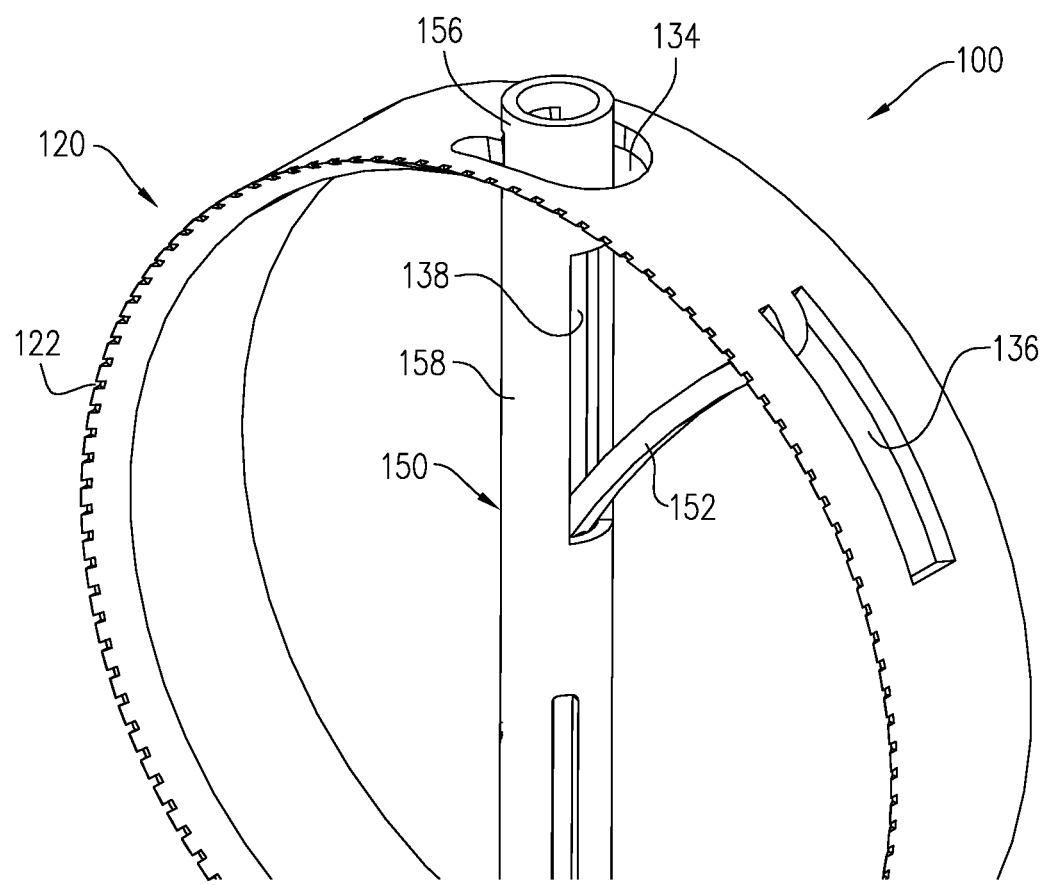
FIG. 3 is a schematic illustration of a portion of a cutting ring of the apparatus for performing capsulorhexis during cataract surgery in an eye of a subject, in accordance with another application of the present invention.

Reference is now made to FIG. 3, which is a schematic illustration of a portion of cutting ring 120, in accordance with some applications of the present invention. As shown, for some applications, sharp cutting edge 122 of cutting ring 120 is shaped to define a serrated cutting edge for facilitating improved cutting of the anterior lens capsule and for preventing adhering of the lens capsule to the cutting ring during the rotational motion of the ring. It is noted that any suitable serrated pattern may be used. It is further noted that cutting ring 120 is shown in FIG. 3 by way of illustration and not limitation, and that sharp cutting edge 122 of cutting ring 220 (shown in FIG. 2) may also be shaped to define a serrated sharp cutting edge.

Figure 4A:
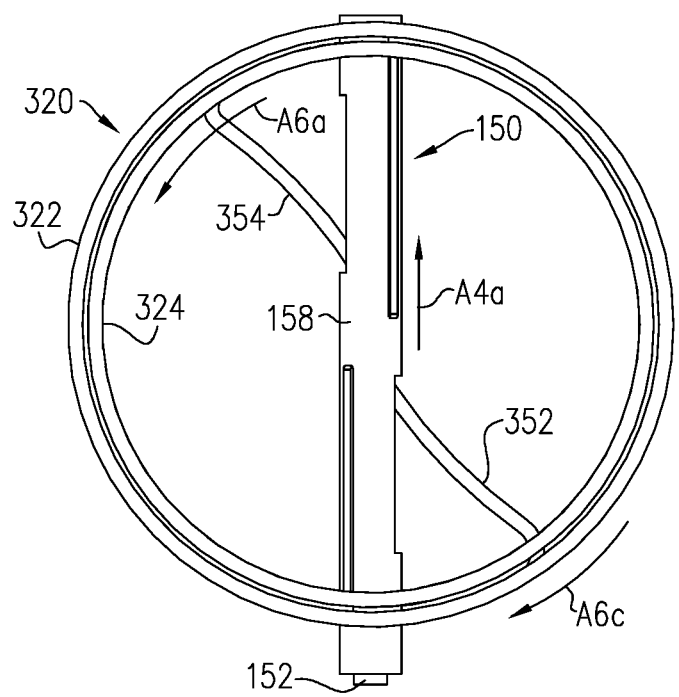
FIGS. 4A, 4B and 4C, which are schematic illustrations of a double-blade cutting ring of the apparatus for performing capsulorhexis during cataract surgery in an eye of a subject, in accordance with some applications of the present invention.
Figure 4B:
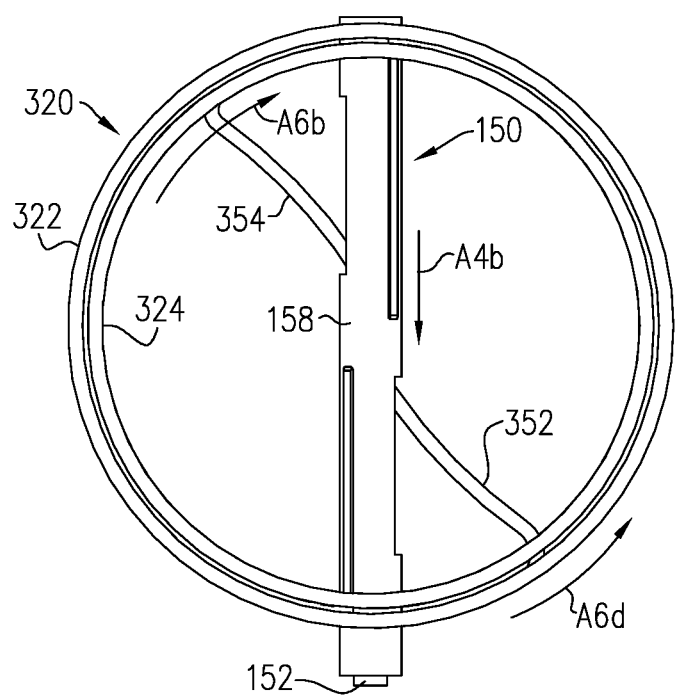
Figure 4C:
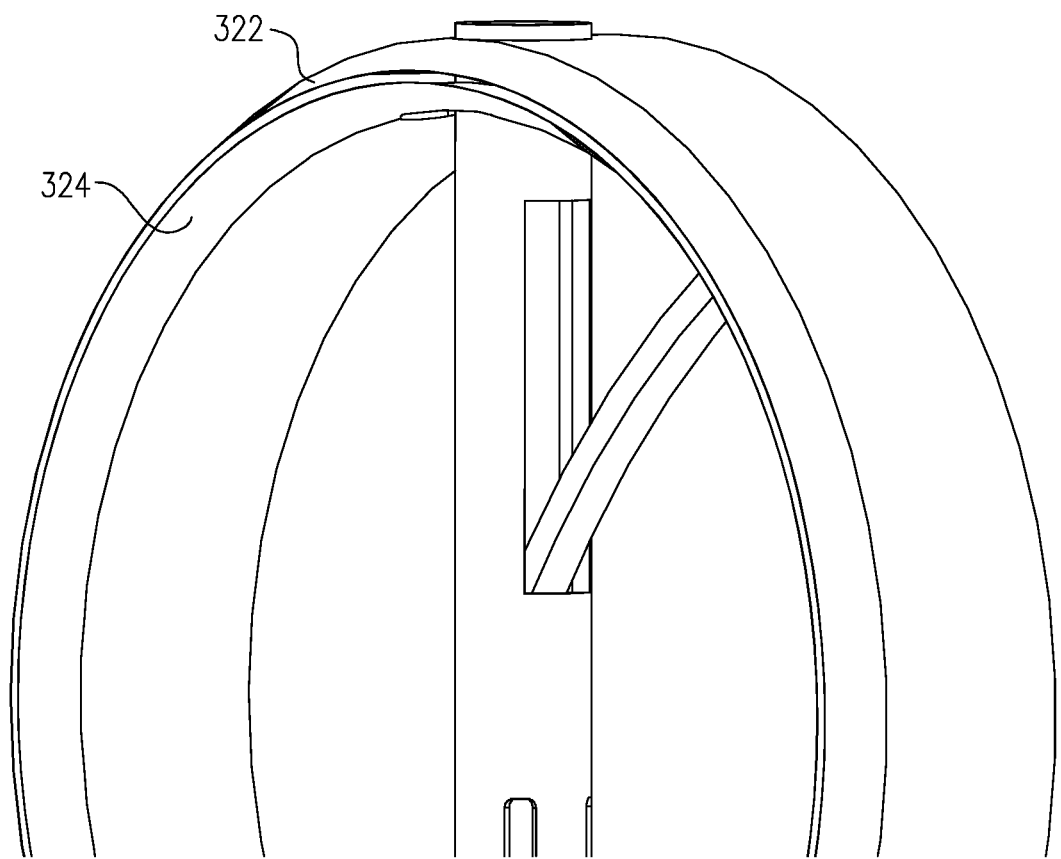

Reference is now made to FIGS. 4A, 4B and 4C, which are schematic illustrations of a double-blade cutting ring 320, for use with apparatus 100 or 200 in accordance with some applications of the present invention. Cutting ring 320 typically comprises first and second concentric cutting rings 322 and 324 each having a sharp cutting edge. In FIGS. 4A-C, double cutting ring 320 is shown being used in apparatus 100 by way of illustration and not limitation. It is noted that the cutting ring of apparatus 200 may also comprise two or more concentric cutting rings.

First and second concentric rings 322 and 324 typically rotate back and forth in opposite directions thereby facilitating smooth and well-defined cutting of the circular aperture in the anterior lens capsule typically while preventing adherence of the lens capsule to the cutting rings.

For example, as shown in FIGS. 4A and 4B, first and second cantilevers 352 and 354 extend from inner shaft 152, to a respective concentric cutting ring (cantilever 352 being coupled to cutting ring 322 and cantilever 354 being coupled to cutting ring 324). As shown, cantilevers 352 and 354 are typically oriented in opposite directions from each other. Reciprocating linear motion imparted to longitudinal motion member 150 is converted by cantilevers 352 and 354 into rotational motion of rings 322 and 324 as described hereinabove with reference to FIG. 1 (motion of cantilever 352 with respect to cutting ring 322 causes rotation of cutting ring 322 and relative motion of cantilever 354 with respect to cutting ring 324 causes rotation of cutting ring 324). The reciprocating axial linear motion of longitudinal motion member 150 is indicated by arrows A4a and A4b.

As shown in FIG. 4A, when longitudinal motion member 150 vibrates in the direction indicated by arrow A4a, first cutting ring 322 rotates in the direction indicated by arrow A6c, and second cutting ring 324 rotates in the direction indicated by arrow A6a. When longitudinal motion member 150 vibrates in the direction indicated by arrow A4b (FIG. 4B), first cutting ring 322 rotates in the direction indicated by arrow A6d, and second cutting ring 324 rotates in the direction indicated by arrow A6b. Thus, rotational back-and-forth motion of the first and second cutting rings in opposing directions is generated, in response to longitudinal motion member 150 moving in the reciprocating axial linear motion. Such motion (typically occurring at a high speed as described hereinabove) reduces the likelihood of the anterior lens capsule adhering to the cutting rings and facilitates clean and defined cutting of the lens capsule.

Typically, cutting edges of first and second cutting rings 322 and 324 are sharpened on opposite edges from each other such that when assembled together, the cutting edges of concentric rings 322 and 324 are closely positioned with respect to each other (as shown in FIG. 4C) further facilitating cutting a clean and well-defined circular aperture in the anterior lens capsule.

Figure 5A:
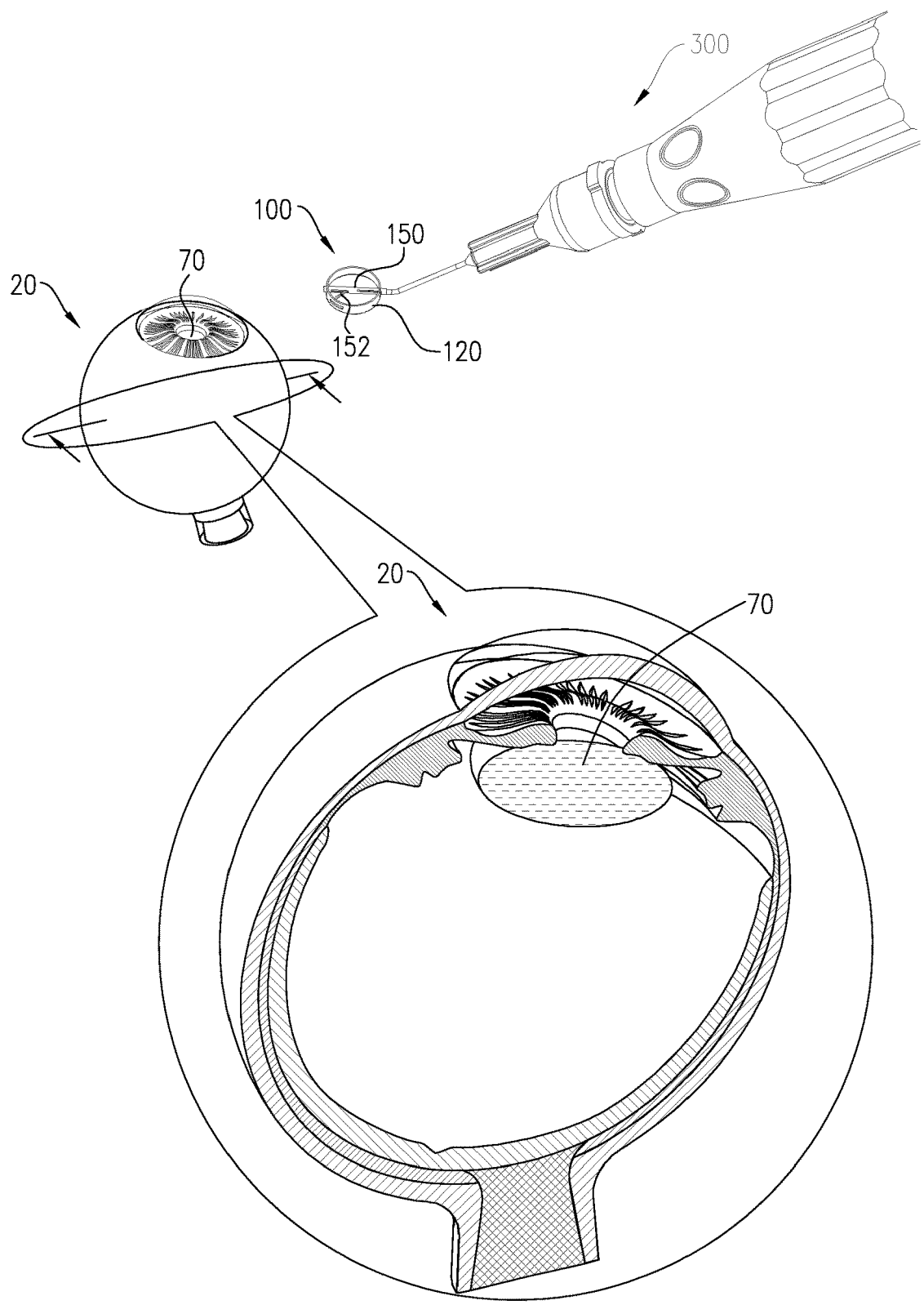
FIGS. 5A and 5B are schematic illustrations of apparatus for performing capsulorhexis used with a phacoemulsification probe motion source during cataract surgery in an eye of a subject, in accordance some applications of the present invention.
Figure 5B:
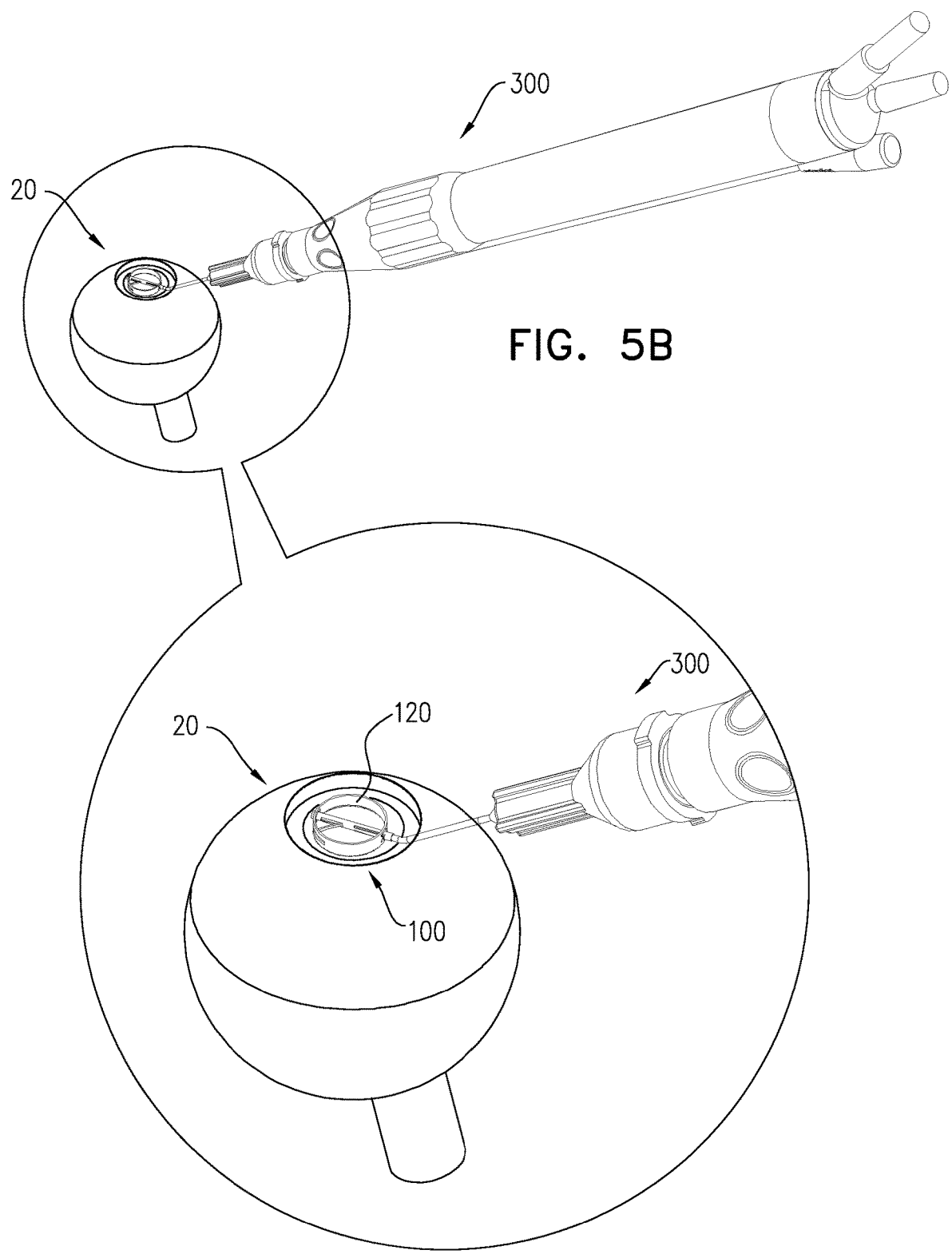

Reference is now made to FIGS. 5A and 5B, which are schematic illustrations of apparatus 100 being used with a phacoemulsification probe 300 motion source during cataract surgery in an eye 20, in accordance some applications of the present invention.

Typically, subsequently to creating a corneal incision in eye 20, apparatus 100 is advanced towards the anterior lens capsule 70, as shown FIG. 5A. Cutting ring 120 is inserted through the incision such that the sharp cutting edge of cutting ring 120 is positioned over anterior lens capsule 70, as shown in FIG. 5B. As shown, longitudinal-motion member 150 is coupled to phacoemulsification probe 300 such that when the probe is activated, vibratory motion of phacoemulsification probe 300 is imparted to the longitudinal motion member. As described hereinabove with reference to FIGS. 1 and 2, phacoemulsification probe 300 may generate reciprocal axial linear motion in the direction indicated by arrow A4 in FIG. 1, or reciprocal transverse linear motion in the direction indicated by arrow A9 in FIG. 2. As further described hereinabove with reference to FIGS. 1 and 2, apparatus 100 and 200 convert the linear motion into back and forth rotational motion of cutting ring 120 (or 220), as indicated by arrow A6. Rotational motion of the sharp cutting edge of cutting ring 120, when in contact with anterior lens capsule 70, produces, in a controlled manner, an accurate circular aperture of a predetermined diameter in anterior lens capsule 70. The cut piece of lens capsule is typically removed and discarded, leaving lens 75 exposed.

Subsequently to performing the capsulorhexis by cutting the aperture in anterior lens capsule 70, apparatus 100 is removed from eye 20. As mentioned in the Background section, typically following capsulorhexis, the lens of the eye is removed by phacoemulsification. In accordance with some applications of the present invention, the same phacoemulsification probe 300 that is used for capsulorhexis is also used to subsequently emulsify and remove the lens.

It is noted that although FIGS. 5A-B show apparatus 100 in use with phacoemulsification probe 300, it is to be understood that apparatus 200 is similarly used with phacoemulsification probe 300, *Mutatis mutandis*.

Figure 6A:
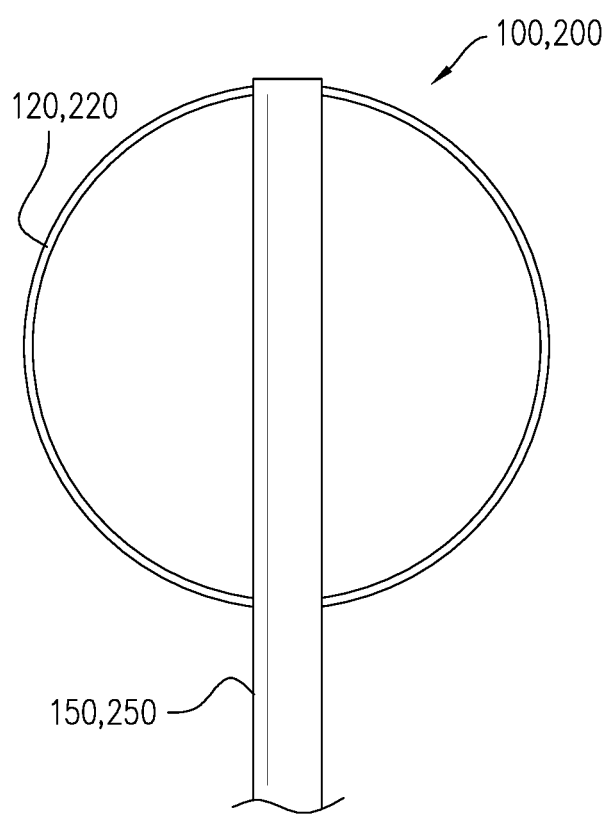
FIGS. 6A and 6B are schematic illustration of apparatus for performing capsulorhexis in an expanded state (6A), and in a compressed state (6B), in accordance some applications of the present invention.
Figure 6B:
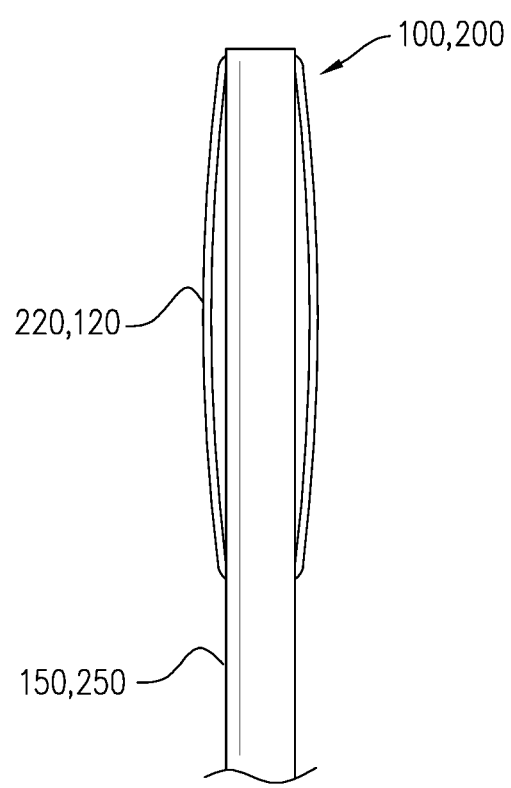

Reference is now made to FIGS. 6A and 6B which are schematic illustration of apparatus 100 or 200 for performing capsulorhexis. Apparatus 100 and 200 are shown in an expanded state (6A), and in a compressed state (6B), in accordance some applications of the present invention. As described hereinabove, with reference to FIG. 1, cutting ring 120 (or 220) is typically a flexible cutting ring. When introduced into the eye through the corneal incision, cutting ring 120 (or 220) is typically radially compressed as shown in FIG. 6B in order to facilitate insertion of the ring through the relatively small incision. Once in the eye, cutting ring 120 (or 220) is expanded, and/or undergoes self-expansion, into the operative state as shown in FIG. 6A.

Figure 7:
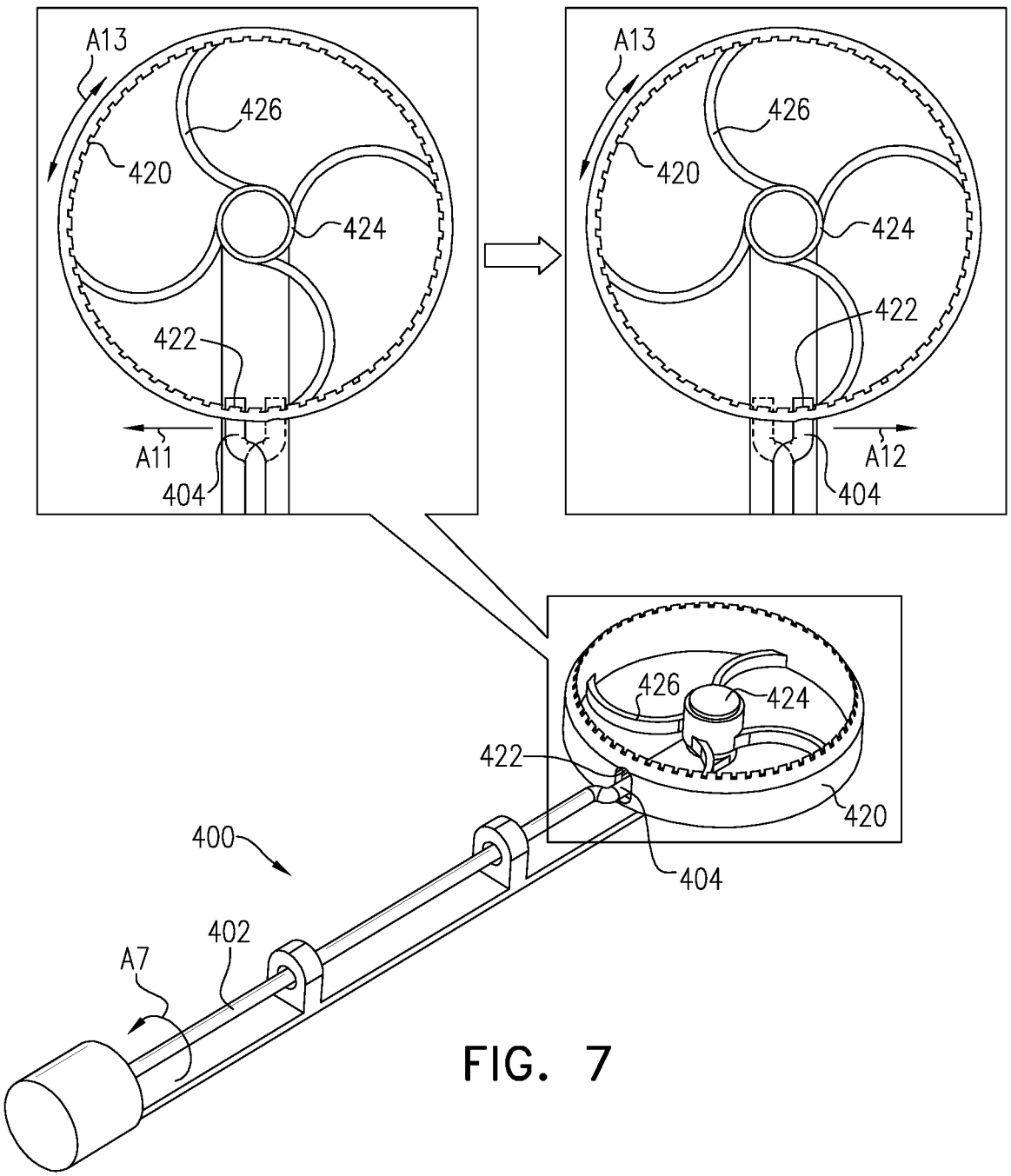
FIG. 7 is a schematic illustration of apparatus for performing capsulorhexis during cataract surgery in an eye of a subject, in accordance with additional applications of the present invention.

Reference is now made to FIG. 7, which is a schematic illustration of apparatus 400 for performing capsulorhexis during cataract surgery in an eye of a subject, in accordance with additional applications of the present invention. For some applications, the apparatus includes an elongate shaft 402, which is coupled, at its proximal end, to a source of motion (not shown) that is configured to generate rotational motion (as indicated by arrow A7). For some applications, the motion source generates rotational motion in a single direction (i.e., clockwise, or counterclockwise (as shown)). Alternatively the motion source is configured to generate rotational motion in both directions, e.g., by alternating between directions.

At the distal end of the elongate shaft, the shaft is curved such as to define an offset axial portion 404 that is offset relative to the proximal end of the shaft. (That is to say that the offset axial portion is radially offset with respect to proximal end of the shaft. However, the offset axial portion is typically parallel to the proximal end of the shaft, as shown.) The offset axial portion of the elongate shaft is coupled to a cutting ring 420 of the apparatus, e.g., by being inserted into an opening 422 of the cutting ring, and/or in some other manner (e.g., by being welded to the ring). (Cutting ring 420 is typically generally similar to cutting rings 120 and 220 described hereinabove. For example the dimensions and configuration of the edges of cutting ring 420 are typically generally similar to those of cutting rings 120 and 220 described hereinabove.) Due to the offset of offset axial portion 404, as the elongate shaft rotates it causes offset axial portion 404 to move from side-to-side in an alternating manner. In turn, this causes the portion of the cutting ring to which offset axial portion 404 is coupled (e.g., opening 422) to move from side-to-side in an alternating manner. For example, referring to FIG. 7, opening 422 of the cutting ring is moved in the direction of arrow A11, and then in the direction of arrow A12, in an alternating manner. In turn, this generates back-and-forth rotational motion of the cutting ring, as described in further detail hereinbelow.

For some applications, the cutting ring is stabilized such that it remains centered about a central axis 424. For example, a plurality of struts 426 may extend radially from the central axis to the cutting ring to stabilize the cutting ring such that it remains centered about central axis 424. Typically, as a result of the cutting ring being maintained such as to be centered about central axis 424, the side-to-side motion of portion 404 is converted to back and forth rotational motion of cutting ring 420, as indicated by arrow A13. Typically, cutting ring 420 is configured to be radially compressed (e.g., as shown in FIG. 6B) in order to facilitate insertion of the ring through the relatively small incision. Further typically, struts 426 are configured to be foldable and to become folded when the cutting ring is radially compressed. Once they are disposed within the eye the cutting ring and the struts are configured automatically assume their expanded states (which are shown in FIGS. 7A-B). For example, the cutting ring and the struts may be made of a shape memory alloy (such as nitinol) that is shape set to the configuration of the cutting ring and the struts that is shown in the FIGS. 7A-B.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. An apparatus for use with a motion source that generates reciprocating linear motion, the apparatus comprising:
   a first cutting ring comprising a sharp cutting edge shaped and sized to engage an anterior lens capsule of the eye;
   a second cutting ring;
   a longitudinal-motion member coupled to the cutting ring, and that is configured to be coupled to the motion source, such that the motion source imparts reciprocating linear motion to the longitudinal motion member; and
   a motion-conversion mechanism coupled to the longitudinal-motion member and to the first and second cutting rings and configured to convert the reciprocating linear motion of the longitudinal-motion member into back-and-forth rotational motion of the first and second cutting rings, the back-and-forth rotational motion of the first cutting ring being in an opposite direction of the back-and-forth rotational motion of the second cutting ring, to create a circular aperture in the anterior capsule of the eye by the cutting ring.

2. The apparatus according to claim 1, wherein the reciprocating linear motion that is generated by the motion source is reciprocating axial linear motion, such that the reciprocating linear motion that the motion source imparts to the longitudinal motion member is reciprocating axial linear motion, and the motion-conversion mechanism is configured to convert the reciprocating axial linear motion of the longitudinal-motion member into the back-and-forth rotational motion of the first and second cutting rings.

3. The apparatus according to claim 1, wherein the reciprocating linear motion that is generated by the motion source is reciprocating transverse linear motion, such that the reciprocating linear motion that the motion source imparts to the longitudinal motion member is reciprocating transverse linear motion, and the motion-conversion mechanism is configured to convert the reciprocating transverse linear motion of the longitudinal-motion member into the back-and-forth rotational motion of the first and second cutting rings.

4. The apparatus according to claim 1, wherein the sharp cutting edge is shaped to define a serrated cutting edge.

5. The apparatus according to claim 1, wherein the motion source includes an ultrasonic motion source.

6. The apparatus according to claim 5, wherein the ultrasonic motion source includes a phacoemulsification probe and wherein the longitudinal-motion member comprises a shaft that is configured to be coupled to the phacoemulsification probe.

7. The apparatus according to claim 1, wherein the motion-conversion mechanism comprises a shaft engaging the longitudinal-motion member and the first and second cutting rings such that the reciprocating linear motion imparted to the longitudinal-motion member produces (a) relative motion of the shaft with respect to the first and second cutting rings, and (b) rotation of the first and second cutting rings with respect to a longitudinal axis of the longitudinal motion member.

8. The apparatus according to claim 1, wherein the apparatus is configured to restrain linear motion of the first and second cutting rings.

9. The apparatus according to claim 8, wherein the longitudinal-motion member comprises an outer shaft that is fixedly coupled to the first cutting ring at a first location on the cutting ring, and an inner shaft that is able to undergo reciprocating linear motion with respect to the first cutting ring and that is coupled to the first cutting ring at a second location on the first cutting ring, such that the reciprocating linear motion that is imparted to the longitudinal-motion member produces the back-and-forth rotational motion of the first cutting ring with respect to the longitudinal motion member.

10. The apparatus according to claim 8, wherein the longitudinal-motion member comprises an inner shaft that is fixedly coupled to the first cutting ring at a first location on the first cutting ring, and an outer shaft that is able to undergo reciprocating linear motion with respect to the first cutting ring and that is coupled to the first cutting ring at a second location on the cutting ring, such that the reciprocating linear motion that is imparted to the longitudinal-motion member produces the back-and-forth rotational motion of the first cutting ring with respect to the longitudinal motion member.

11. An apparatus for use with a motion source that generates reciprocating linear motion, the apparatus comprising:
a cutting ring comprising a sharp cutting edge shaped and sized to engage an anterior lens capsule of the eye;
a longitudinal-motion member coupled to the cutting ring, and that is configured to be coupled to the motion source, such that the motion source imparts reciprocating linear motion to the longitudinal motion member; and
a motion-conversion mechanism coupled to the longitudinal-motion member and to the cutting ring and configured to convert the reciprocating linear motion of the longitudinal-motion member into back-and-forth rotational motion of the cutting ring to create a circular aperture in the anterior capsule of the eye by the cutting ring,
wherein the motion-conversion mechanism comprises a shaft engaging the longitudinal-motion member and the cutting ring such that the reciprocating linear motion imparted to the longitudinal-motion member produces (a) relative motion of the shaft with respect to the cutting ring, and (b) rotation of the cutting ring with respect to a longitudinal axis of the longitudinal motion member,
wherein the cutting ring comprises a first cutting ring and wherein the apparatus further comprises at least a second cutting ring, and
wherein the apparatus further comprises a first cantilever engaging the longitudinal-motion member and the first cutting ring, and a second cantilever engaging the longitudinal-motion member and the second cutting ring.

12. The apparatus according to claim 11, wherein the motion source includes an ultrasonic motion source.

13. The apparatus according to claim 12, wherein the ultrasonic motion source includes a phacoemulsification probe and wherein the longitudinal-motion member comprises a shaft that is configured to be coupled to the phacoemulsification probe.

14. A method for creating a circular aperture in the anterior capsule of an eye of a subject, comprising:
creating a corneal incision in the eye of the subject;
inserting first and second cutting rings through the incision;
positioning a sharp cutting edge of the first cutting ring over the anterior capsule of the eye;
activating a motion source to produce reciprocating linear motion;
using a motion-conversion mechanism, generating back-and-forth rotational motion in the first and second cutting rings by converting the reciprocating linear motion into the back-and-forth rotational motion, the back-and-forth rotational motion of the first cutting ring being in an opposite direction of the back-and-forth rotational motion of the second cutting ring; and
creating a circular aperture in the anterior capsule of the eye using the back-and-forth rotational motion of the first and second cutting rings.

15. The method according to claim 14, wherein inserting the first and second cutting rings through the incision comprises radially compressing the first and second cutting rings to facilitate insertion of the first and second cutting rings through the incision.

16. The method according to claim 14, wherein the reciprocating linear motion includes reciprocating axial linear motion, and wherein converting comprises converting the reciprocating axial linear motion into the back-and-forth rotational motion.

17. The method according to claim 14, wherein the reciprocating linear motion includes reciprocating transverse linear motion, and wherein converting comprises converting the reciprocating transverse linear motion into the back-and-forth rotational motion.

* * * * *